United States Patent
Jain et al.

(10) Patent No.: US 11,429,379 B2
(45) Date of Patent: Aug. 30, 2022

(54) SOFTWARE CHECKPOINT-RESTORATION BETWEEN DISTINCTLY COMPILED EXECUTABLES

(71) Applicant: Siemens Industry Software Inc., Plano, TX (US)

(72) Inventors: Twinkle Jain, Boston, MA (US); Vipul Kulshrestha, Burlington, MA (US); Kenneth W. Crouch, Cambridge, MA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/417,561

(22) PCT Filed: Aug. 28, 2019

(86) PCT No.: PCT/US2019/048537
§ 371 (c)(1),
(2) Date: Jun. 23, 2021

(87) PCT Pub. No.: WO2020/146011
PCT Pub. Date: Jul. 16, 2020

(65) Prior Publication Data
US 2022/0043650 A1 Feb. 10, 2022

Related U.S. Application Data

(60) Provisional application No. 62/790,502, filed on Jan. 10, 2019.

(51) Int. Cl.
*G06F 8/71* (2018.01)
*G06F 8/656* (2018.01)
*G06F 11/36* (2006.01)

(52) U.S. Cl.
CPC ............... *G06F 8/71* (2013.01); *G06F 8/656* (2018.02); *G06F 11/3612* (2013.01); *G06F 11/3664* (2013.01)

(58) Field of Classification Search
USPC ........................................................ 717/170
See application file for complete search history.

(56) References Cited

U.S. PATENT DOCUMENTS

| | | |
|---|---|---|
| 6,981,243 B1 | 12/2005 | Browning et al. |
| 2014/0289707 A1 | 9/2014 | Guan et al. |

(Continued)

FOREIGN PATENT DOCUMENTS

| | | |
|---|---|---|
| CN | 102736948 | 10/2012 |
| CN | 103902251 | 7/2014 |

(Continued)

OTHER PUBLICATIONS

N Lanke, Implementations of Checkpoint Restart Systems, 2006, Derwent, pp. 1-34. (Year: 2006).*

(Continued)

*Primary Examiner* — John Q Chavis

(57) ABSTRACT

A system and method for software checkpoint-restoration between distinctly compiled executables is disclosed. A first compiled version of the software, such as Version A, is executed. After which, checkpointing is performed in order to generate a checkpoint image. After checkpointing, restarting execution is performed with at least some of a second compiled version of the software, such as Version B, being executed using a switching function that is configured to switch execution upon restart at least partly to the second compiled version of the software. In this way, different executable versions may be used during the restart than during the initial execution, such as an unoptimized build during the restart versus an optimized build during the initial (Continued)

execution, so that software testing and/or debugging may be performed more efficiently.

33 Claims, 7 Drawing Sheets

(56) References Cited

U.S. PATENT DOCUMENTS

| | | | |
|---|---|---|---|
| 2014/0366007 | A1 | 12/2014 | Koltachev et al. |
| 2015/0006487 | A1 | 1/2015 | Yang et al. |
| 2017/0364425 | A1 | 12/2017 | Haid et al. |
| 2018/0107585 | A1 | 4/2018 | Ramesh et al. |
| 2018/0196732 | A1* | 7/2018 | Dolev ................ G06F 9/45558 |

FOREIGN PATENT DOCUMENTS

| | | |
|---|---|---|
| CN | 104063258 | 9/2014 |
| CN | 104115120 | 10/2014 |
| CN | 106471476 | 3/2017 |

OTHER PUBLICATIONS

"Application checkpointing" from Wikipedia, the free encyclopedia last modified Jul. 12, 2019, downloaded from the Internet on Aug. 14, 2019 at https://en.wikipedia.org/wiki/Application_checkpointing, 5 pages.

"List of debuggers" from Wikipedia, the free encyclopedia last modified Jul. 31, 2019, downloaded from the Internet on Aug. 14, 2019 at https://en.wikipedia.org/wiki/List_of_debuggers, 3 pages.

"Trampoline (computing)" from Wikipedia, the free encyclopedia last modified Apr. 19, 2019, downloaded from the Internet on Aug. 14, 2019 at https://en.wikipedia.org/wiki/Trampoline_(computing), 3 pages.

"Debugging Optimized Code and Inline Functions", Microsoft Windows, Dec. 5, 2018, 4 pages.

PCT International Search Report and Written Opinion of International Searching Authority dated Nov. 22, 2019 corresponding to PCT International Application No. PCT/US2019/048537 filed Aug. 28, 2019.

Chinese Office Action dated Feb. 15, 2022, for CN Application 2019800886117, 16 pages.

* cited by examiner

SOFTWARE CHECKPOINT-RESTORATION BETWEEN DISTINCTLY COMPILED EXECUTABLES

REFERENCE TO RELATED APPLICATION

This application claims the benefit of U.S. Provisional Application Ser. No. 62/790,502, filed on Jan. 10, 2019, the entirety of which is incorporated by reference herein.

FIELD

The present disclosure relates to the field of computing technology, and specifically relates to software checkpoint-restoration between distinctly compiled executables.

BACKGROUND

Debugging of software includes identifying, analyzing and removing errors in the software. Typically, debugging occurs during testing of the software and is considered to be an extremely complex and tedious task due to the complexity of software. The debugging process may include any one, any combination, or all of: problem identification; problem analysis (including using modeling, documentations, finding and testing candidate flaws, etc.); defect corrections (e.g., by making needed changes to the software); and validation of the defect corrections.

Further, various debugging strategies may be used in the debugging process including any one, any combination, or all of: forward analysis of the software (e.g., tracing the problem forward using breakpoints or print statements and studying the results; the section where the incorrect outputs are obtained is the section of interest); backward analysis of the software (e.g., tracing the program backward from the location of the failure message in order to identify the section of faulty code); or system study for recent changes (e.g., focusing on recent changes to the software).

Various debugging tools, such as open-source debugging tools or proprietary debugging tools, are available (e.g., GNU debugger (GDB), WinDbg, dbx, etc.). For example, WinDbg is a proprietary debugger for Windows® applications that is configured to debug software.

The software may come in various forms, such as an optimized software build (interchangeably known as an optimized build or a production build) or unoptimized software build (interchangeably known as an unoptimized build). For example, the software may be compiled into its unoptimized build or may be compiled into its optimized build. In this way, the executables in the unoptimized build and the optimized build may differ so that execution of the optimized build is improved in one or more aspects, including speed of execution, use of memory, or the like. Software optimization may be performed in one of several ways, including by using optimizing compilers (e.g., a compiler that improves operation by one or more of the following: local optimization; global optimization; loop optimization; machine code optimization; etc.).

Debugging may be performed on the unoptimized build or on the optimized build. For example, the unoptimized build may be debugged using available checkpoint tools and using various techniques, such as print statements in the code. In practice, the debugger executes the software locally from the beginning of the unoptimized software in order to take a single checkpoint near the crash. However, executing the unoptimized build may prove less efficient, particularly for large applications which take longer to execute. Alternatively, debugging may be performed on the optimized build, which results in proceeding to the crash quicker than when executing the unoptimized build. However, debugging may, generally speaking, be more difficult when working on the optimized build because the compiler, in generating the optimized build, has performed optimizations, which may result in several variables in the code being unavailable for viewing and in certain functions becoming in-lined and therefore unavailable for viewing or modification.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Figure 1:
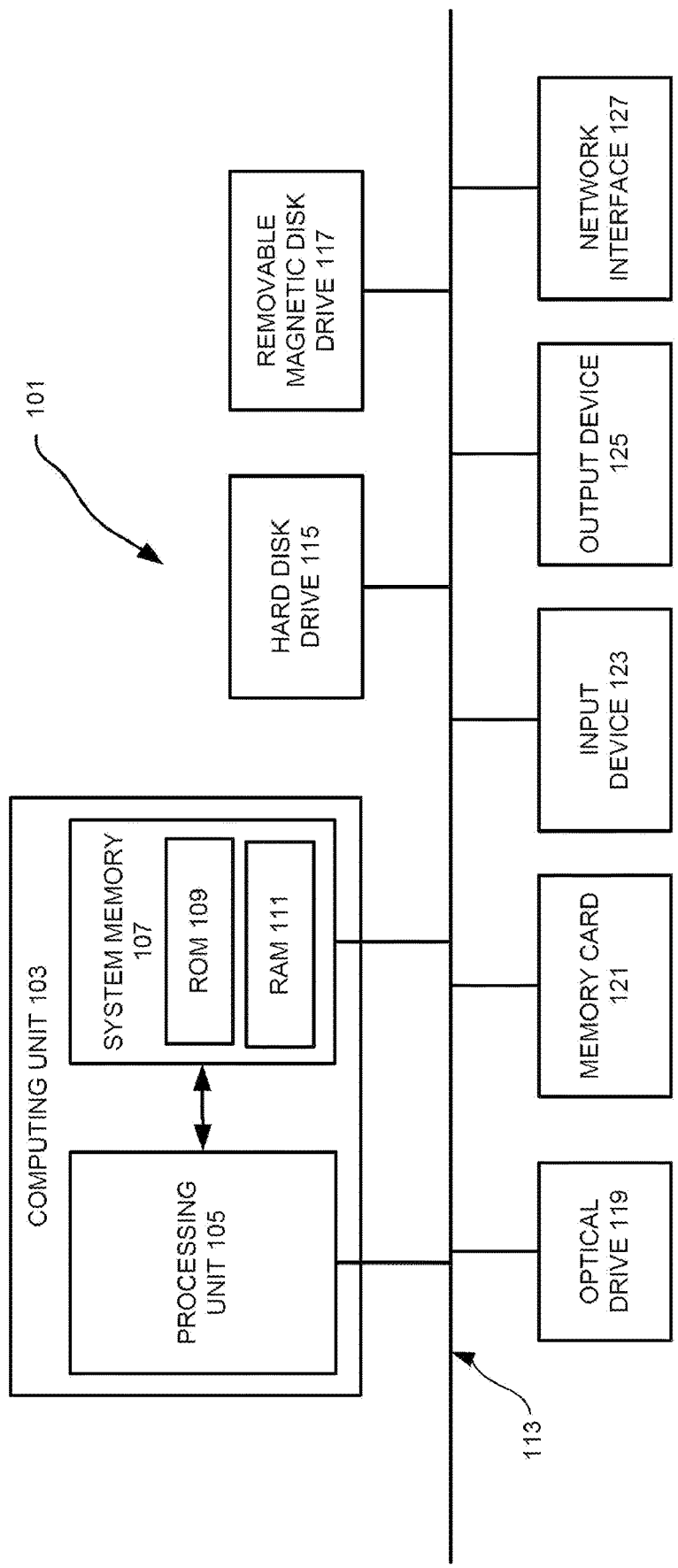
FIG. 1 illustrates an example of a computing system that may be used to implement various embodiments of the disclosed technology.

Various aspects of the present disclosed technology relate to testing or verifying software, including debugging software and/or developing patches for software between distinctly compiled executables. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on one or more non-transitory computer-readable media (e.g., tangible non-transitory computer-readable media such as one or more optical media discs, volatile memory or storage components (such as DRAM or SRAM), or nonvolatile memory or storage components (such as hard drives)), software instructions executed on a computer, or some combination of both. Some of the disclosed techniques, for example, can be implemented as part of software debugging tool. The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers. For clarity, only certain selected aspects of the software-based implementations are described. Other details that are well known in the art are omitted. For example, it should be understood that the disclosed technology is not limited to any specific computer language, software tool (including software debugging tool), or computer. Any of the disclosed methods can alternatively be implemented (partially or completely) in hardware (e.g., an ASIC, PLD, or SoC).

Further, although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "generate," "access," and "determine" to describe the disclosed methods. Such terms are high-level abstractions of the actual operations that are performed. The actual operations that correspond to these terms will vary depending on the particular implementation and are readily discernible by one of ordinary skill in the art.

Furthermore, any of the software-based embodiments (comprising, for example, computer-executable instructions which when executed by a computer cause the computer to perform any of the disclosed methods or to create design data for any of the disclosed apparatus) can be transmitted, received, or accessed through a suitable communication means. For example, a server computer can transmit to a client computer the computer-executable instructions for performing any of the disclosed methods or for creating design data for any of the disclosed apparatus (e.g., after the server receives a request from the client computer to download the computer-executable instructions). Similarly, any circuit description, design file, data structure, data file, intermediate result, or final result created or modified using any of the disclosed methods or describing any of the disclosed apparatus can be transmitted, received, or accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. Such communication means can be, for example, part of a shared or private network.

Illustrative Operating Environment

The execution of various software testing and/or debugging processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. In one embodiment, the computer system runs a single processing thread. Alternatively, because of the complexity of testing software, various software testing tools may be configured to operate on a computing system capable of simultaneously running multiple processing threads. The components and operation of a computer network will be described with reference to FIG. 1. In one embodiment, the components and operation of the computer network have a host or master computer and one or more remote or servant computers. Alternatively, the components and operation of the computer network may include a single computer. In this regard, either operating environment is contemplated. Further, these operating environments are only examples of a suitable operating environment. Thus, it is not intended to suggest any limitation as to the scope of use or functionality of the disclosed technology.

FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but may conventionally be a processor, such as a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the network interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the disclosed technology may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both. It also should be appreciated that the description of the computer network illustrated in FIG. 1 is provided as an example only, and it not intended to suggest any limitation as to the scope of use or functionality of alternate embodiments of the disclosed technology.

Software Checkpoint and Restoration

As discussed above, software testing and/or debugging may be quite complex. Further, runtime differences between an optimized build and an unoptimized build may be significant. For example, in some integrated circuit (IC) simulation or emulation applications, an unoptimized build may be several times (e.g., three times) slower than the optimized build. The overhead of debugging an unoptimized build may be tolerable for a short-running application but may not be acceptable for a large and long-running application, such as software executions that may take multiple hours, days, or even weeks to execute a single run.

In addition, a customer may not wish to share all the information (e.g., the input design in the case of IC emulation applications) with the software developer. Yet, the customer may still wish for the software developer to resolve software issues, such as debugging and/or testing. In such a case, it may be extremely difficult to debug all the bugs/issues correctly with a production build. Thus, to debug software effectively, it is beneficial to use the unoptimized build of the software even if using the unoptimized build is costly in terms of both execution time and computational resources.

One solution may be to opt for different application-specific optimization techniques, such as using special macros to skip unnecessary print statements. Another solution may be for the customer to send the design to the software developer since the software developer will not release the unoptimized build to the customer. The software developer may use publicly-available checkpoint-restart tools to checkpoint near the crash locally at the software developer's site. However, there are at least two drawbacks. First, customers often do not share their proprietary designs with the software developer. Second, even if the customer decides to share the design, the software developer still needs to start the application locally from the beginning of the program in order to take a single checkpoint near the crash.

The software checkpoint-restoration features disclosed herein may address some or all of these issues. In one or some embodiments, a first compiled version of the software (e.g., Version A) is executed. After which, checkpointing is performed in order to generate a checkpoint image (e.g., the checkpoint image saving the data structures and the data set of the executed software, such as the first compiled version of the software, at the time of checkpointing). After checkpointing, restarting execution is performed with at least some of a second compiled version of the software (e.g., Version B) being executed using a switching function that is configured to switch execution upon restart at least partly to the second compiled version of the software (e.g., restart by executing the second compiled version of the software using the data structures and data set saved at the time of checkpointing). Various differences between the first compiled version of the software and the second compiled version of the software are contemplated. As one example, the first compiled version may comprise an optimized build of the software and the second compiled version may comprise an unoptimized build of the software (e.g., an optimizing compiler may generate the optimized build from the software, whereas a different compiler may generate the unoptimized build of the software; both the optimized build and the unoptimized build use the same data structures and the data set at the time of checkpoint). As one example, upon restart, all new functions called after restart (including those functions that were called before restart and are called again after restart) are from the unoptimized build. As another example, upon restart, fewer than all new functions called (such as only a software patch) are executed from the unoptimized build and a remainder of all new functions called after restart are executed from the optimized build.

Alternatively, or in addition, the first build of the software and the second build of the software may differ from one another in the content of the software. For example, a compiler may generate the first build from a first version of the software and a compiler (such as the same type of compiler used to generate the first build or a different type of compiler) may generate the second build from a second version of the software. The second version of the software may differ from the first version of the software in that at least a part of the second version is different from the first version (e.g., a software patch is resident in the second version that is different from or is not resident in the first version). Nevertheless, both the first build and the second build use the same data structures and data set at the time of checkpoint so that upon restart, the second build may access the data structures and data set saved at the time of checkpointing. Thus, the first build and the second build may both comprise optimized builds (e.g., both are compiled from their respective version of the software using an optimizing compiler). Alternatively, one of the first build or the second build comprises an optimized build, and the other comprises an unoptimized build (e.g., the first build is an optimized build and the second build is an unoptimized build). Still alternatively, the first build and the second build may both comprise unoptimized builds.

Checkpointing (also known as software checkpointing) comprises saving a snapshot or checkpoint image of the software's state at the time of checkpointing. Checkpointing may be used for one or more reasons. For example, checkpointing may be used for debugging purposes whereby the checkpoint may be performed at or near the software crash so that debugging using the checkpoint image may be performed thereafter in order to diagnose the error or bug in the software. As another example, checkpointing may be used for software patch purposes. A software patch may comprise one or more changes to the software or its supporting data in order to update, fix, and/or improve the software program. More specifically, different versions of the software may be tested, such as version A of the software includes Algorithm A; version B of the software includes Algorithm B; and version C of the software includes Algorithm C, with each version upon restart using the same data structures and data set in the checkpoint image in order to compare operation of the different versions (e.g., a single checkpoint image may be used to test each of Algorithms A, B, and C for speed). As still another example, checkpointing may be used to debug the software patch. Checkpointing may likewise be used for: migration (e.g., starting a process on host X; thereafter checkpointing in order to restart on host Y that is different from host X); live migration; fault tolerance (e.g., checkpointing is used between machines for fault tolerance); or a defined point to restart execution.

Various aspects of the software's state may be saved in the checkpoint image, including the state of all variables and other data at the time of checkpointing, as discussed in more detail below. Further, checkpointing may be performed in one of several ways including using: a proprietary checkpoint engine; a fault tolerance interface (FTI) checkpoint engine; a Berkeley Lab Checkpoint/Restart (BLCR) engine; a Distributed MultiThreaded CheckPointing (DMTCP) engine; a collaborative checkpointing engine; or the like.

For example, a checkpoint engine (such as DMTCP) may transparently checkpoint a single-host or distributed computation in user-space, with no modifications to user code or to the operating system. Such checkpoint engines may be used on Linux applications, including Python, Matlab, R, GUI desktops, MPI, etc. As discussed in further detail below, the software checkpoint restoration technology disclosed herein may invoke a checkpoint or a restart through checkpoint engine plugins. Further, upon restart, the executable executed upon restart may see only the environment variables from the time of checkpoint.

Separately (or in combination) with checkpointing after executing the first executable, a switching engine may perform one or both of the following: copying of the second executable (e.g., unoptimized debug version and/or patch); and implementing a jump (such as a redirect) so that upon restart at least a part of the second executable (e.g., the unoptimized version) is executed. In one implementation, all new functions called after restart are in the second executable (e.g., the unoptimized build). Alternatively, only a subset of new functions called are in second executable (e.g., the unoptimized build). For example, only a software patch in unoptimized form may be executed upon restart whereas all other functions are executed in the optimized build.

In addition, upon restart, debugging may be performed in one of several ways. For example, in one way, a GNU Project debugger (GNB) may be used in order to "see" what is occurring inside another program as it executes. Alternatively, or in addition, a software patch (or other software program to work in conjunction with the original software) may be executed in its unoptimized portion and may potentially be debugged in the process.

Figure 2:
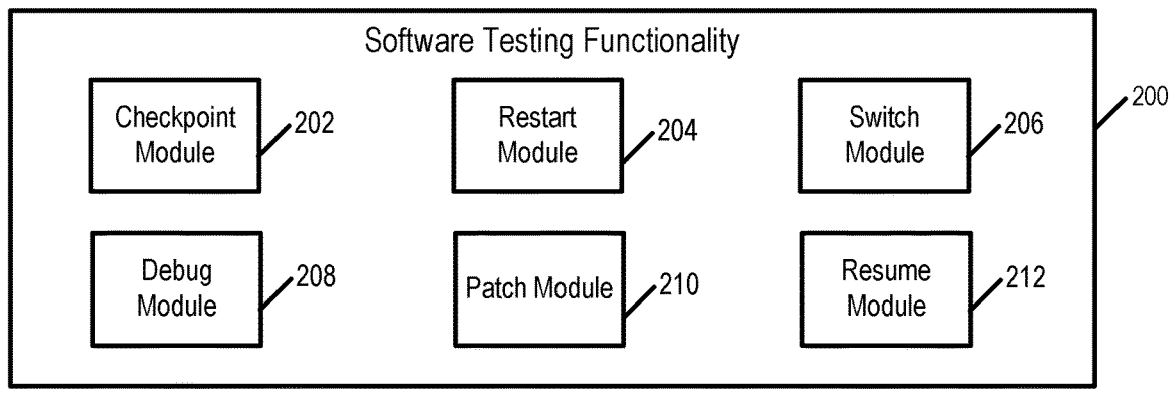
FIG. 2 illustrates a block diagram of the software testing functionality.

Referring to back the figures, FIG. 2 illustrates a block diagram of the software testing functionality 200. The software testing functionality 200 may be resident in various parts of computing device 101, such as in system memory 107. The software testing functionality 200 may include one or more modules or engines, such as checkpoint module 202, restart module 204, switch module 206, debug module 208, patch module 210, and resume module 212. Though FIG. 2 illustrates various functions divided into different modules, the various functions may be organized in different ways, including combining functions into common modules and/or dividing functions into different modules. In this regard, organization of the software testing functionality 200 in FIG. 2 is merely for illustration purposes.

Checkpoint module 202 may comprise any type of checkpoint engine, such as proprietary checkpoint engines or publicly available checkpoint engines, as discussed above. Further, restart module 204, which may be part of or separate from checkpoint module 202, may be configured to access the checkpoint image in order to restart execution of the software. Switch module 206, discussed further below, is configured to perform one or both of the following: (1) install the second executable (e.g., debug software/patch); and (2) configure a jump from the text section of a checkpoint to the installed second executable (e.g., debug software/patch). As discussed above, the debug software/patch may be part of an unoptimized build or an optimized build. Debug module 208 may comprise debug software, such as GNB software, discussed above. Patch module 210 may include one or more patch programs for installation by the switch module 206. Resume module 212 is configured to resume execution of the optimized build after debugging or patch testing.

As discussed above, one checkpoint engine may be based on DMTCP. In practice, DMTCP does not require any changes in the software application itself as long as the application is dynamically linked. Further, an event-based checkpoint engine plugin, such as a DMTCP-compatible plugin, may be used to make the particular functions and their descendants suitable for debugging. The event-based checkpoint engine plugin may have event-hooks that trigger on checkpoint events, such as for various operations including any one, any combination, or all of: Initialization; Checkpoint; Restart; and Resume.

Figures 3A, 3B:
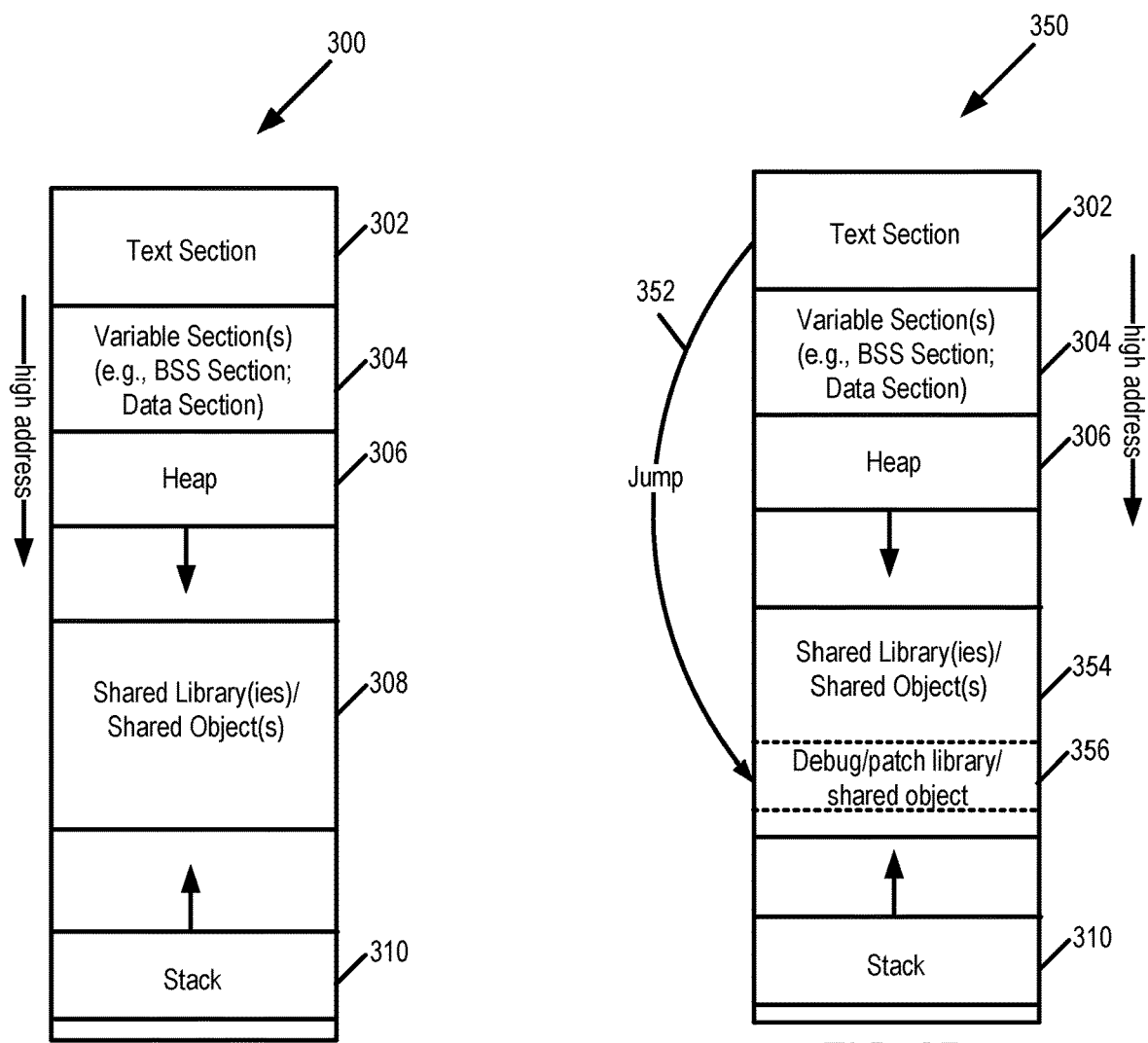
FIGS. 3A-B illustrate block diagrams of a first example of the application process memory layout at checkpoint (FIG. 3A) and at restart (FIG. 3B).

FIG. 3A illustrates a block diagram 300 of a first example of the application process memory layout at checkpoint. Application process memory layout comprises the contents of memory assigned to the application during execution of the application and includes text section 302 (in which the code may reside), variable section(s) 304 (in which values for variables, including constant and dynamic value variables, may be stored; example sections include BSS section and Data section, discussed further below), heap 306 (which may be used for dynamic memory allocation), and stack 310 (which may be used for static memory allocation). Application process memory layout may further include one or more shared libraries/shared objects 308 for performing some or all of the functionality illustrated in FIG. 2, as discussed further below.

FIG. 3B illustrates a block diagram 350 of a first example of the application process memory layout at restart. Upon restart, the application process memory layout further includes debug/patch library/shared object 356 stored in shared library(ies)/shared object(s) 354 and a jump 352 from text section 302 to shared library(ies)/shared object(s) 354. As discussed in more detail below, in one or some embodiments, debug/patch library/shared object 356 is an unoptimized build. Further, the jump 352 enables execution of the debug/patch library/shared object 356 upon restart.

Figure 4A:
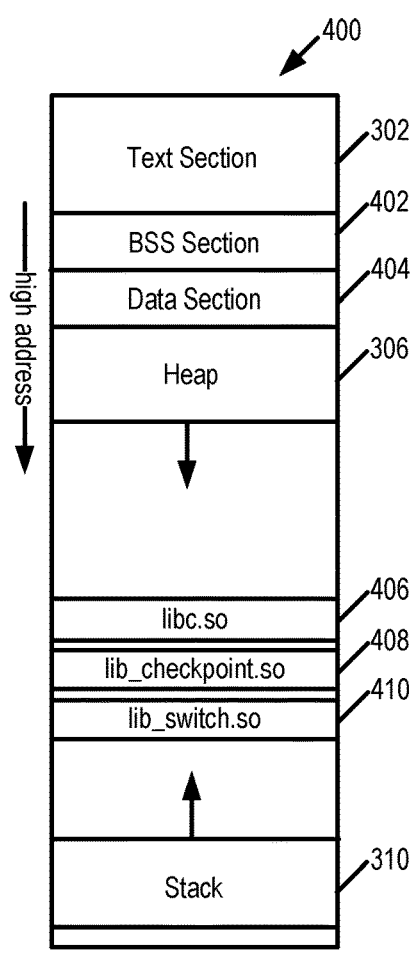
FIGS. 4A-B illustrate block diagrams of a second example of the application process memory layout at checkpoint (FIG. 4A) and at restart (FIG. 4B).

FIG. 4A illustrates a block diagram 400 of a second example of the application process memory layout at checkpoint. As shown, the application process memory layout includes BSS section 402 and data section 404. Further, various libraries may be loaded, including a standard library (e.g., standard C library libc.so 406), a checkpoint library (lib_checkpoint.so 408), and a switching library (lib_switch.so 410), discussed further below. Thus, prior to checkpoint, along with a checkpoint engine library (lib_checkpoint.so 408), lib_switch.so 410 is also loaded into the application process memory layout.

In one or some embodiments, the switch module, such as switch module 206, is configured to work in conjunction with the checkpoint module 202. For example, when using a checkpoint engine (such as the DMTCP checkpoint engine), the switch module may comprise a checkpoint engine plugin (such as a DMTCP checkpoint engine plugin) in order to extend the checkpoint engine functionality. An example of the checkpoint engine plugin comprises lib_switch.so 410. lib_switch.so 410 may thus include code to switch from the a first executable (e.g., the optimized build) to a second executable (e.g., the debug (unoptimized) version) at restart time.

Figure 4B:
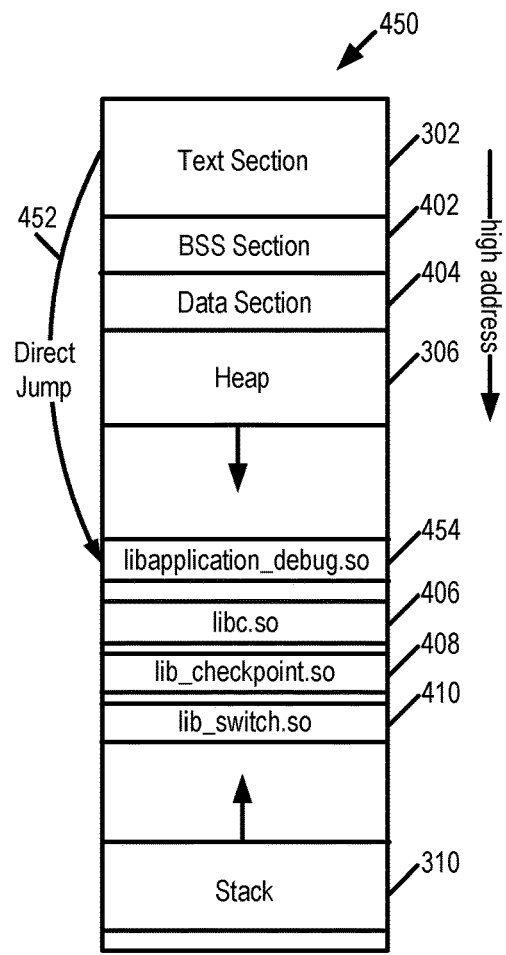

FIG. 4B illustrates a block diagram 450 of a second example of the application process memory layout at restart. Prior to restart, lib_switch.so 410 is configured to perform two actions, including copying the second executable (e.g., the unoptimized debug or patch, shown as libapplication_debug.so 454) and to install a direct jump 452 to the second executable (e.g., the unoptimized debug or patch).

libapplication_debug.so 454 is an example of building a debug shared library for the application. In one example, the '-fPIC' compiler flag for gcc and the '-export-dynamic' linker flag are used to build the shared debug library libapplication_debug.so 454 from necessary object files. As discussed above, libapplication_debug.so 454 is loaded to the application process memory on first restart from the checkpoint image, thus loading an unoptimized build into the application process memory layout prior to restart.

In practice, the direct jump 452 may comprise an instruction-level safe jump (from the text symbol from the base executable's text section 302 to the library's text section (libapplication_debug.so 454)) to indicate movement to the second executable (e.g., the unoptimized debug or patch). The redirection or movement to the second executable (e.g., the unoptimized debug or patch) may be performed in one of several ways. For example, a "trampoline" may be used in order to move to a different code path, specifically, the second executable (e.g., the unoptimized debug or patch). In particular, some checkpoint engines include the ability to set and unset trampolines. So that, the desired control flow, such as from the optimized build execution prior to restart to the unoptimized debug or patch at restart, may use trampolines in order to effect the desired control flow. Thus, in one or some embodiments, there is a direct jump assembly instruction from the start address of each function in the text section of the application, to another address in the loaded shared debug library (e.g., to an address of a corresponding function in the unoptimized build, such as in libapplication_debug.so 454). Examples of such are described next through FIGS. 5A and 5B.

Figure 5A:
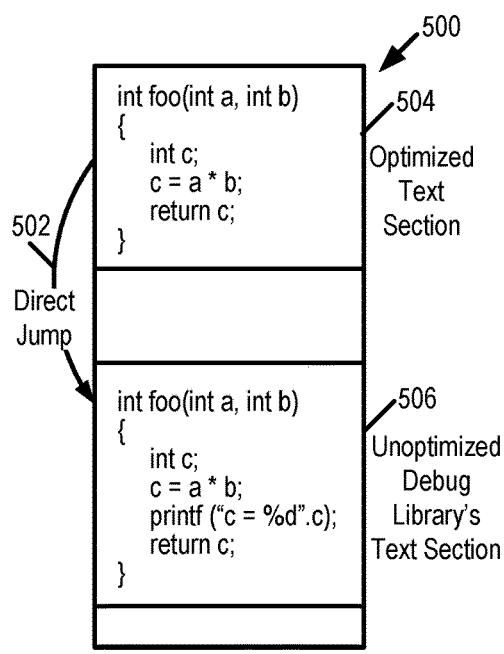
FIGS. 5A-B illustrate block diagrams of a detailed view of the direct jump for the unoptimized debug library's text section (FIG. 5A) and the unoptimized patch text section (FIG. 5B).
Figure 5B:
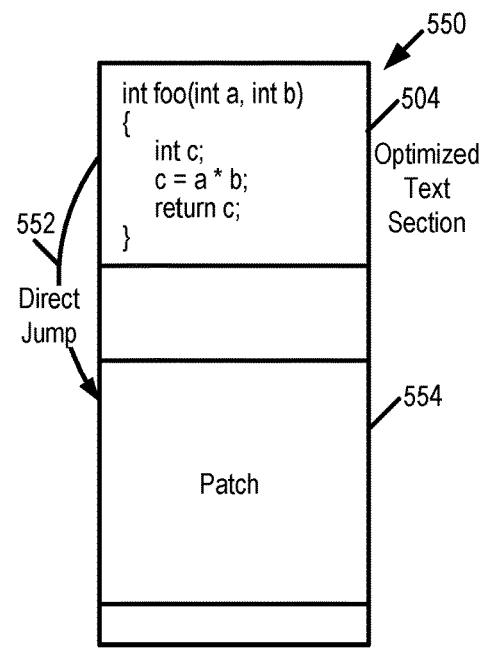

FIG. 5A illustrates a block diagram 500 of a detailed view of the direct jump 502 from the optimized text section 504 to the unoptimized debug library's text section 506. Similarly, FIG. 5B illustrates a block diagram 550 of a detailed view of the direct jump 552 from the optimized text section 504 to the unoptimized patch text section 554.

FIG. 5A further illustrates that there are two copies of the same function resident in the application process memory's address space in preparation for the restart. There is also an absolute address jump (e.g., direct jump 502) placed from optimized to unoptimized text section. This jump may be analogous to the 'goto' keyword in 'C' language. Similarly, FIG. 5B illustrates a block diagram 550 of a detailed view of the direct jump 552 for the patch text section 554, which may be optimized or unoptimized. In one or some embodiments, the patch text section 554 may include solely the software patch unoptimized, or may include the software patch and debug capability unoptimized. Though not illustrated in FIGS. 5A-B, the absolute address jump may be configured from an optimized to an optimized text section, or from an unoptimized to an unoptimized text section.

Alternatively, instead of using a direct jump, wrappers may be used. Specifically, if a technique uses wrappers, each function in the application may then switch control to the second version (e.g., unoptimized version) of the same function, thereby achieving a similar result as using the direct jump. Though, using wrappers may comprise more overhead than using the direct jump as there would be one more layer of indirection each time that any function is invoked. This is in contrast to the direct jump, which works at the assembly instruction level so that there is no need to set the trampoline again with each call to the function.

Using wrappers may also have the following drawbacks: it may be impractical to build wrappers for all the various functions in the application (e.g., an IC emulation application may have tens of thousands of functions); with regard to software maintenance, every time the developer adds a new function to the application, the wrapper may also need to be added and setup appropriately.

Further, separate from installing the direct jump, executable and linkable format (ELF) symbol extraction may be performed. In particular, lib_switch.so 410 may extract and resolve the software program's ELF symbols while maintaining the correctness of the running application.

Figure 6A:
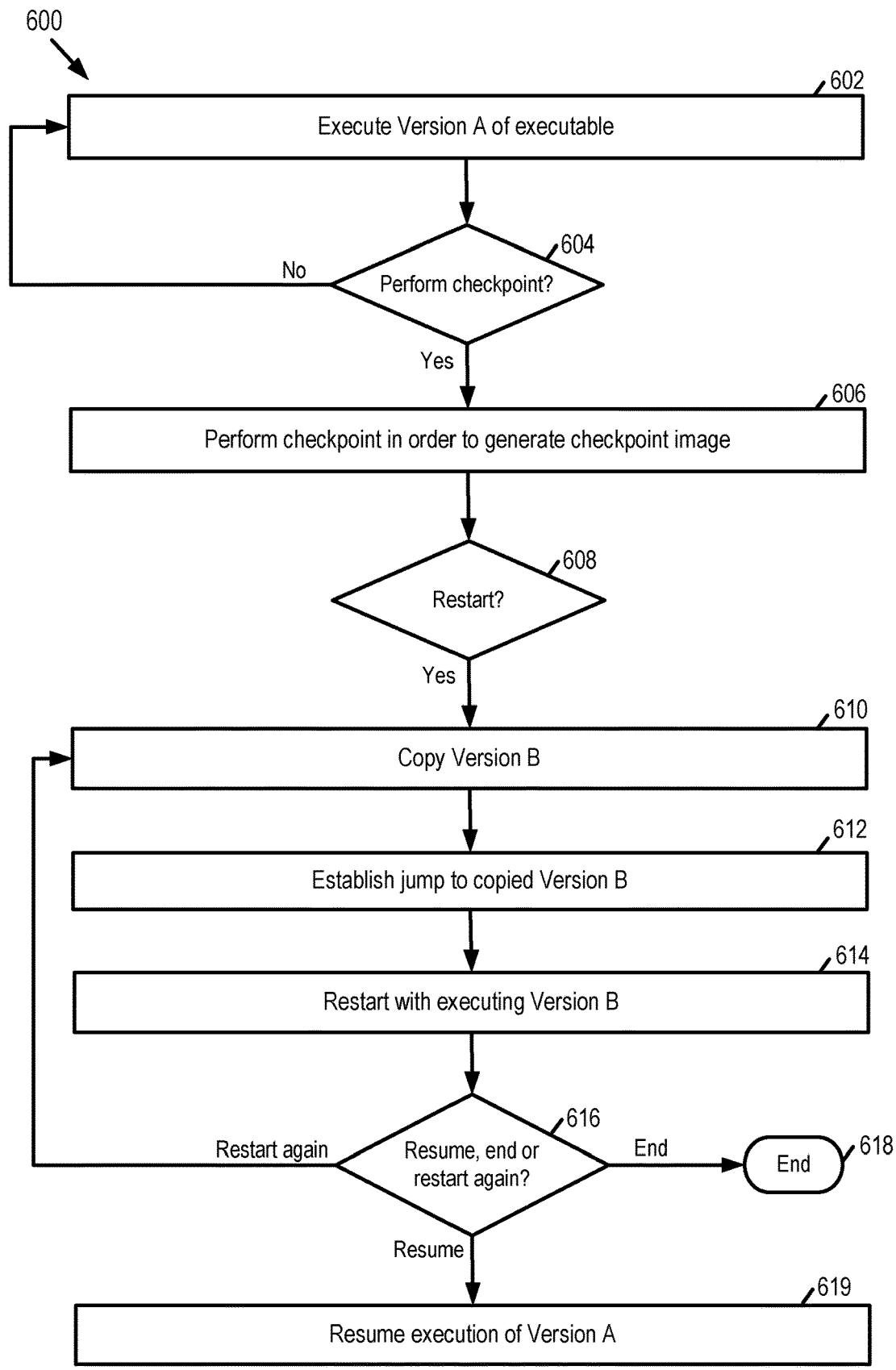
FIG. 6A is a flow diagram for performing a checkpoint, a restart and a resume using different executable versions.

FIG. 6A is a flow diagram 600 for performing a checkpoint, a restart and a resume using different executable versions. As discussed above, different executable versions, such as a first executable described as version A and a second executable described as version B, may be generated. For example, version A may comprise a more optimized build or an optimized build and version B may comprise a less optimized build or an unoptimized build. As another example, version A may comprise the software program and version B may comprise a modified version of the software program, such as including a patch to the software program. One version, such as the optimized build, may first be executed prior to checkpoint, and second version, such as the unoptimized build, may be executed upon restart, as discussed below with regard to FIG. 6B.

At 602, Version A of the executable is executed. At 604, it is determined whether to perform checkpointing. If not, flow diagram 600 loops back to 602. If so, at 606, checkpointing is performed in order to generate a checkpoint image of Version A. For example, an application-initiated checkpoint may be used. In particular, the checkpoint engine, such as DMTCP, may perform the regular checkpoint upon comparing the phase name with an environment variable called APPLICATION_CHECKPOINT. The environment variable may store the desired phase after which the checkpoint function is called.

At 608, it is determined whether to restart. As one example, restart may be performed after a first checkpointing. As another example, multiple checkpoints may be performed prior to restart. Responsive to determining the restart, at 610, Version B is copied into the application process memory layout. Further, at 612, a jump is established from the text of version A to the copy of Version B in the application process memory layout. At 614, restart occurs by executing Version B.

At 616, it is determined whether to end, to resume execution, or to restart again. If it is determined to end, flow diagram 600 goes to 618. If it is determined to restart again, flow diagram 600 loops back to 610. In this way, multiple restarts may be performed in order to perform additional debugging or test additional patches. If it is determined to resume, at 619, execution of Version A is resumed.

Figure 6B:
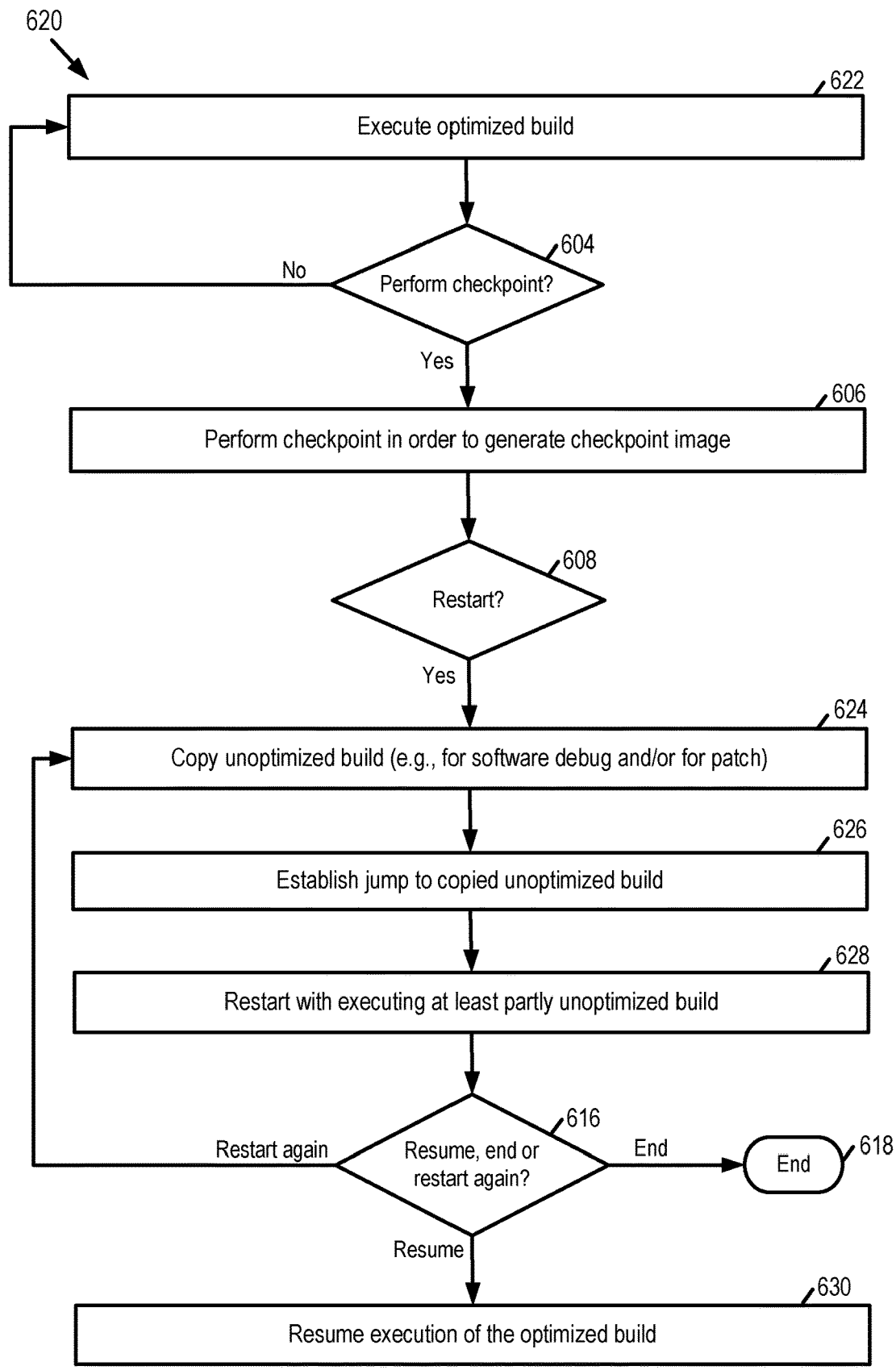
FIG. 6B is a flow diagram for performing a checkpoint, a restart and a resume using optimized and unoptimized builds.

FIG. 6B is a flow diagram 620 for performing a checkpoint, a restart and a resume using optimized and unoptimized builds. At 622, the optimized build is executed. At 604, it is determined whether to perform a checkpoint. If not, flow diagram 620 loops back to 622. If so, at 606, the checkpoint is performed in order to generate the checkpoint image. At 608, it is determined whether to restart.

In the example of an IC emulation application, the optimized version of the IC emulation application may be executed under the checkpoint engine with the plugin lib_switch.so. For example, according to checkpoint engine's launch command line syntax, IC emulation software may be launched/started under the checkpoint engine as shown in the following: dmtcp_launch—with-plugin [path-to-lib_switch.so] <application-command>. A configuration file may be created to set up environment variables for use by lib_switch.so to switch/patch.

In either instance, after determining to restart, at 624, an unoptimized build is copied into the application process memory layout. As discussed above, the unoptimized build may be copied for different purposes. As one example, the unoptimized build may be copied for use during restart in order to debug. As another example, the unoptimized build may be copied for use during restart in order to patch the software. As still another example, the unoptimized build may be copied for use during restart in order to debug the patch. Further, the purpose for the restart may dictate the content of the unoptimized build copied into the application process memory. In the event that the unoptimized build is for debugging the software, the software code for the unoptimized build may be similar to what is already stored in application process memory with one or both of the following differences: (i) the software code is compiled unoptimized; and (ii) the software code may include additional programming (e.g., print statements or the like, see 506 in FIG. 5) for use in debugging.

In the event that the unoptimized build is for patching the software, the software code for the patch may be similar to what is already stored in application process memory with two differences including: (i) the software code is compiled unoptimized; and (ii) the software code may include additional or different programming to address the bug in the software. In the event that the unoptimized build is for debugging the software patch, the software code for the patch may be similar to what is already stored in application process memory with three differences including: (i) the software code is compiled unoptimized; (ii) the software code may include additional or different programming to address the bug in the software; and (iii) the software code may include additional programming (e.g., print statements or the like, see 506 in FIG. 5) for use in debugging. Again, the software patch may be resident in an unoptimized build, such as discussed with regard to FIG. 6B. Alternatively, the software patch may be resident in an optimized build, as discussed above.

At 626, a jump is established between the text section and the unoptimized build. For example, a trampoline may be established at the specific text location upon checkpoint to the unoptimized build, akin to the 'goto' keyword in the 'C' language. This is illustrated, for example, in FIG. 3A (352) and FIG. 4A (452). As discussed above, one library/shared object may perform both of 624 and 626 (e.g., lib_switch.so 410). Alternatively, two separate libraries/shared objects may perform 624 and 626.

Figure 7A:
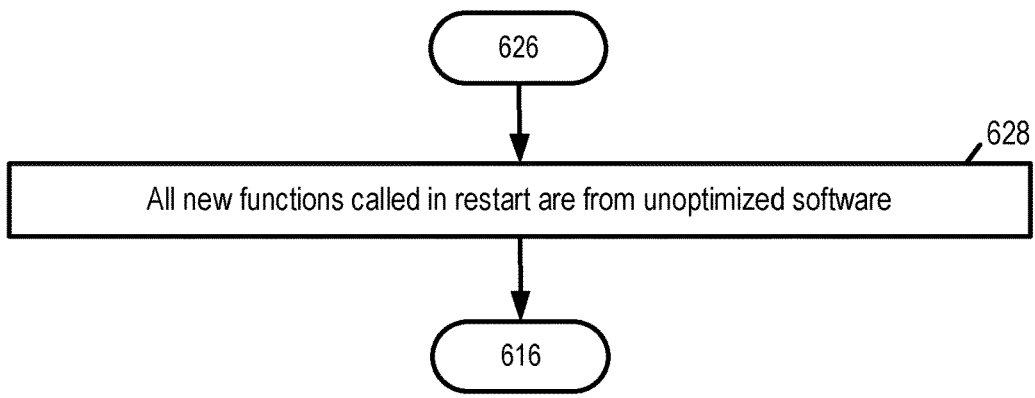
FIG. 7A is a first flow diagram for restarting execution with all new functions called as unoptimized software.
Figure 7B:
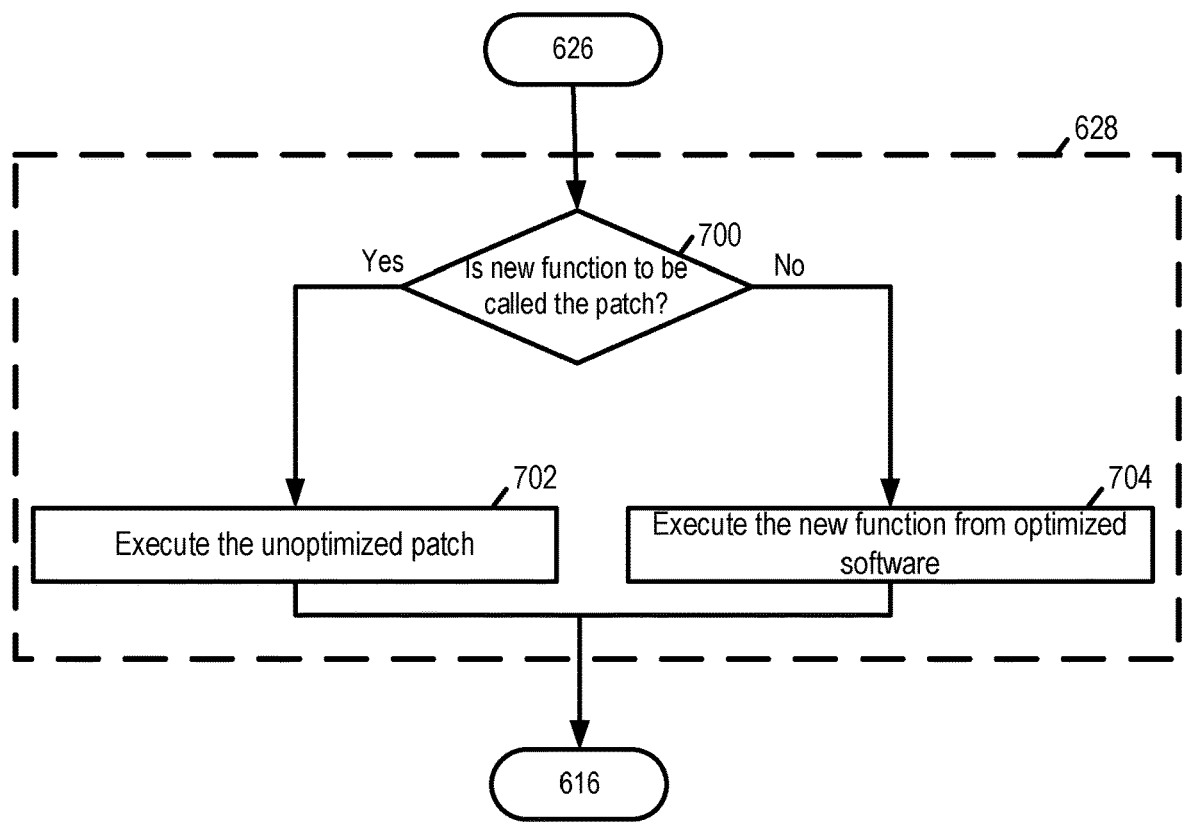
FIG. 7B is a second flow diagram for restarting execution with a subset of all new functions (e.g., only the patch) called as unoptimized software.

At 628, the restart is performed by executing the unoptimized build. In one or some implementations, all new functions called during the restart are executed with the unoptimized build, as illustrated in FIG. 7A, which may be used during debugging. In other embodiments, only a subset of new functions are called are with the unoptimized build (such as only functions directed to the software patch). For example, as illustrated in FIG. 7B, at 700, it is determined whether the new function called is the software patch. If not, at 704, the new function s executed from the optimized software. If so, at 702, the unoptimized patch is executed (e.g., 554 in FIG. 5B).

Thus, in one or some implementations, the application is restarted using the second executable version (e.g., the unoptimized version) of the application with the checkpoint engine, such as DMTCP, restoring all the memory sections of the checkpointed process. Thereafter, the checkpoint engine, such as DMTCP, may pass control of the restart event to the switch plugin (e.g., lib_switch.so 410). The switch plugin may thus perform any one, any combination, or all of the following tasks before the application restarts from the checkpointed state:

a) use a Python script to extract symbols information from both the base optimized executable and the debug shared library;

b) run the compatibility test on the symbols extracted in the-previous step and raise flags if not compatible;

c) resolve all the symbols and store the required symbol's information into a file (the file may also have information for a mapping from the address of the same symbol in the optimized code to the corresponding address in the unoptimized code so that the shared library loaded at restart time (libapplication_debug.so 454) includes the same symbols as the base production build of the application);

d) inject the debug shared library (libapplication_debug.so 454) to the base executable's address space;

e) make the data consistent between the base executable and the newly injected debug library (libapplication_debug.so 454);

f) install trampoline(s) from the desired source to destination addresses; and g) flow of control returns from the checkpoint engine plugin (lib_switch.so) back to the application's code.

In this way, upon restart, use of the application process memory size may increase significantly (e.g., due to multiple builds, such as both optimized and unoptimized builds, being stored).

At 616, it is determined whether to end, to resume execution, or to restart again. If it is determined to end, flow diagram 620 goes to 618. If it is determined to restart again, flow diagram 620 goes back to 624. In this way, multiple restarts may be performed in order to perform additional debugging or test additional patches. If it is determined to resume, at 630, execution of the optimized build is resumed.

Figure 8A:
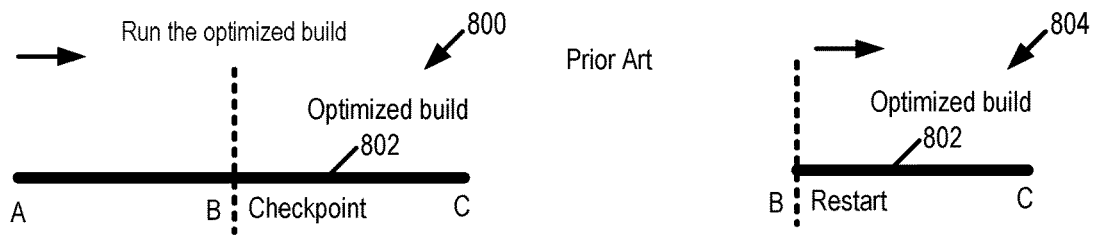
FIG. 8A-B are flow diagrams of prior art checkpointing and restarting.
Figure 8B:
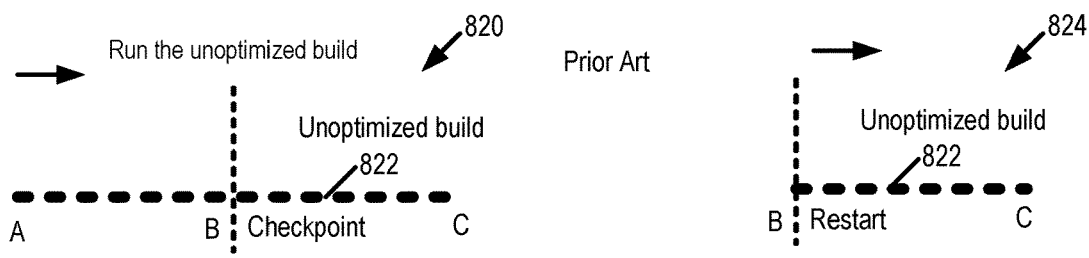

FIG. 8A-B are flow diagrams of prior art checkpointing and restarting. FIG. 8A illustrates the flow of the programs that are used including starting at point A and checkpointing at point B. As shown at 800, a single optimized build 802 is used throughout, including until checkpoint and thereafter. Likewise, as shown at 804, the single optimized build is used upon restart. Likewise, FIG. 8B shows at 820 the single unoptimized build 822 is used throughout, including until checkpoint and thereafter. Likewise, as shown at 824, the single unoptimized build is used upon restart.

Figure 8C:
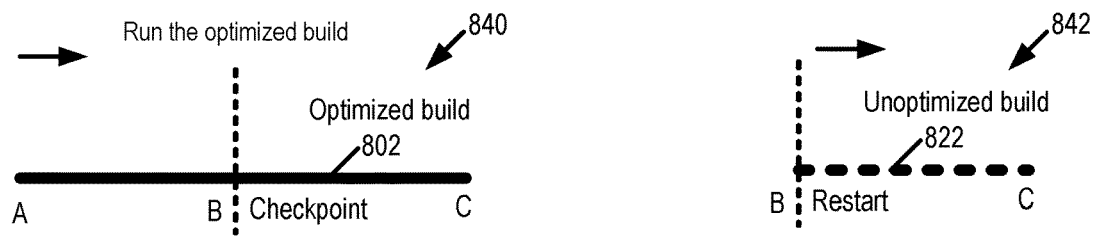
FIG. 8C-D are flow diagrams of checkpointing and restarting, with all new functions being called during restart in unoptimized software (FIG. 8C) or a subset of new functions being called during restart in unoptimized software (FIG. 8D).
Figure 8D:
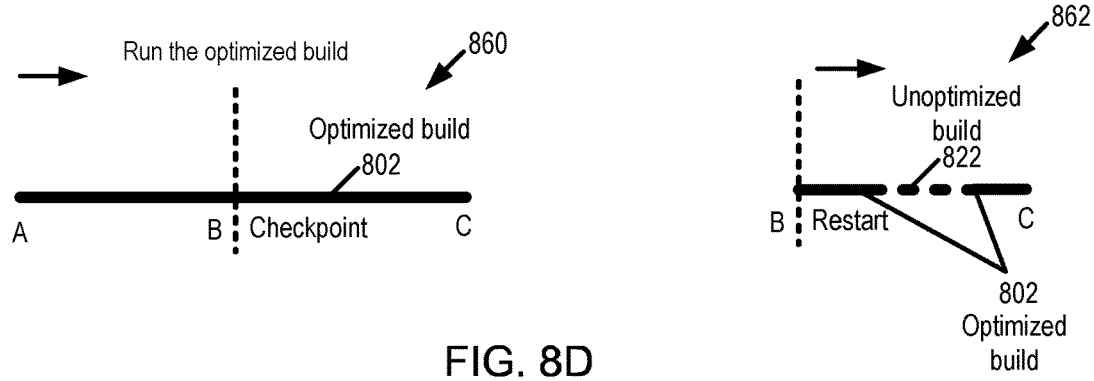

In contrast, FIG. 8C-D are flow diagrams of checkpointing and restarting, with all new functions being called during restart in unoptimized software (FIG. 8C) or a subset of new functions being called during restart in unoptimized software (FIG. 8D). In particular, FIG. 8C at 840 illustrates that up until checkpoint and after resuming, the optimized build is executed and that upon restart at 842 the unoptimized build is executed (e.g., switching to the unoptimized debug version). Similarly, FIG. 8D illustrates at 860 that up until checkpoint and after resuming, the optimized build is executed and that upon restart at 862 at least some of the unoptimized build 822 is executed and at least some of the optimized build 802 is executed (e.g., switching to the unoptimized patch version and continuing to use the optimized remainder version). Alternatively, a first optimized build may be used up until checkpointing and a second optimized build may be used upon restart, or a first unoptimized build may be used up until checkpointing and a second unoptimized build may be used upon restart.

In this way, a checkpoint engine may be extended so that a checkpoint at an application-specified safe place in the first executable (e.g., the optimized build) may be performed. The plugin, which may work in combination with or may be integrated with the checkpoint engine, may switch to the second executable (e.g., the unoptimized build) upon restart. This may therefore avoid prior solutions of, other than checkpoint-restart, only being able to run the same executable from the beginning. Further, this likewise solves the inability of prior checkpoint-restart tools to restart in an unoptimized build from a checkpoint image if the checkpoint image was taken from an optimized executable. In contrast, the methodology disclosed enables switching optimization levels at the time of restart, with the restart being based on the checkpoint image taken when near the crash. This methodology may significantly improve the debug productivity of the software development team that manages/maintains the R&D of the software application.

Further, in one or some embodiments, the plugin may work in combination with a checkpoint engine. Thus, the methodology need not require any changes in the application code itself and is therefore non-intrusive, and makes the methodology generic and applicable to a large number of different kinds of applications.

Further, this methodology may execute a software patch for one or more specific functions upon restart. The methodology may change the optimization level for only a select few functions (e.g., directed to the functions for the patch) to the unoptimized build rather than switching the entire application on restart to the unoptimized build. In this regard, the optimization level of the patched function may be independent of the checkpointed process's optimization level.

Using this methodology for patching may allow any one or both of: speed in patching; or debugging the patches. In particular, restarting with only the patching version unoptimized may save time than a restart that switches the entire application to the unoptimized build. Further, a problem being debugged by a software developer may not be easily reproducible. Taking a checkpoint allows the developer to reproduce the issue in a consistent manner. Further, the ability to make a small change in the software application and still be able to apply such change on top of the existing checkpoint image enables one or both of the following new capabilities:

(i) in case of difficult-to-reproduce bugs. it may be even harder to verify whether the patch fix worked correctly. Using this methodology, the developer may test the patch fix on the real problem and be more confident about the patch fix; and (ii) debugging effectiveness for some issues may be significantly improved by the developer if the developer could modify the code (e.g., adding a "for loop" that can print contents of some large database; while this may be performed from a debugger like GDB, it is often difficult if the contents of the database are large and many debug statements are needed to print the content; conditional breakpoints in GDB are quite expensive and make the debug very slow: instead, by patching the executable, the developer may convert the conditional breakpoint into actual code to be executed).

In this way, the ability to patch the executable from checkpoint image restored process may improve the debug efficiency both by allowing better debug processes as well as easier verification of a candidate patch fix.

The following example embodiments of the invention are also disclosed:

Embodiment 1

A computer-implemented method for performing a checkpoint and a restart between distinctly compiled executables of a software program, the method comprising:

executing a first version build of the software program, the first version build comprising a first distinctly compiled executable of the software program;

performing a checkpoint by saving a checkpoint image of execution of the first version build at the checkpoint; and restarting execution, using the saved checkpoint image of execution of the first version build at the checkpoint, at least partly using a second version build of the software program or a modified version of the software program, the second version build comprising a second distinctly compiled executable that is different from the first distinctly compiled executable.

Embodiment 2

The method of embodiment 1, wherein the first version build comprises a more optimized version than the second version build the software program.

Embodiment 3

The method of any of embodiments 1 and 2, wherein the first version build comprises an optimized build of the software program generated by an optimizing compiler; and wherein the second version build comprises an unoptimized build, the unoptimized build compiled from the software program or the modified version of the software program using a compiler different from the optimizing compiler.

Embodiment 4

The method of any of embodiments 1-3, further comprising, after restarting execution at least partly using the unoptimized build, resuming execution of the software program using the optimized build.

Embodiment 5

The method of any of embodiments 1-4,
further comprising:
installing, after performing the checkpoint, the unoptimized build; and
installing a jump from a text section of the software program to the unoptimized build.

Embodiment 6

The method of any of embodiments 1-5,
further comprising performing debugging on the unoptimized build at least partly while restarting execution.

Embodiment 7

The method of any of embodiments 1-6,
wherein restarting execution exclusively uses the unoptimized build without using the optimized build at all.

Embodiment 8

The method of any of embodiments 1-7,
wherein the unoptimized build is compiled from the modified version of the software program comprising a software patch; and
further comprising testing the software patch build at least partly while restarting execution.

Embodiment 9

The method of any of embodiments 1-8,
wherein, during the restart of execution, only the software patch is executed in the unoptimized build and a remainder of the execution during the restart is the optimized build.

Embodiment 10

The method of any of embodiments 1-9, wherein the second version build is of the modified version of the software program.

Embodiment 11

The method of any of embodiments 1-10,
wherein the checkpoint image comprises data structures and data set of the first version build at checkpointing; and
wherein the modified version of the software comprises a software patch configured to use the data structures and the data set upon restart.

Embodiment 12

One or more non-transitory computer-readable media storing computer-executable instructions for causing one or more processors performance of a method according to any of embodiments 1-11.

Embodiment 13

A system, comprising: one or more processors, the one or more processors programmed to perform a method according to any of embodiments 1-11.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A computer-implemented method for performing a checkpoint and a restart between distinctly compiled executables of a software program, the method comprising:
   executing a first version build of the software program, the first version build comprising a first distinctly compiled executable of the software program;
   performing a checkpoint by saving a checkpoint image of execution of the first version build at the checkpoint; and
   restarting execution, using the saved checkpoint image of execution of the first version build at the checkpoint, at least partly using a second version build of the software program or a modified version of the software program, the second version build comprising a second distinctly compiled executable that is different from the first distinctly compiled executable.

2. The method of claim 1, wherein the first version build comprises a more optimized version than the second version build the software program.

3. The method of claim 2, wherein the first version build comprises an optimized build of the software program generated by an optimizing compiler; and
   wherein the second version build comprises an unoptimized build, the unoptimized build compiled from the software program or the modified version of the software program using a compiler different from the optimizing compiler.

4. The method of claim 3, further comprising, after restarting execution at least partly using the unoptimized build, resuming execution of the software program using the optimized build.

5. The method of claim 3, further comprising:
   installing, after performing the checkpoint, the unoptimized build; and
   installing a jump from a text section of the software program to the unoptimized build.

6. The method of claim 5, further comprising performing debugging on the unoptimized build at least partly while restarting execution.

7. The method of claim 6, wherein restarting execution exclusively uses the unoptimized build without using the optimized build at all.

8. The method of claim 5, wherein the unoptimized build is compiled from the modified version of the software program comprising a software patch; and
   further comprising testing the software patch build at least partly while restarting execution.

9. The method of claim 8, wherein, during the restart of execution, only the software patch is executed in the unoptimized build and a remainder of the execution during the restart is the optimized build.

10. The method of claim 1, wherein the second version build is of the modified version of the software program.

11. The method of claim 10, wherein the checkpoint image comprises data structures and data set of the first version build at checkpointing; and
    wherein the modified version of the software program comprises a software patch configured to use the data structures and the data set upon restart.

12. One or more non-transitory computer-readable media storing computer-executable instructions for causing one or more processors performance of a method comprising:
- executing a first version build of a software program, the first version build comprising a first distinctly compiled executable of the software program;
- performing a checkpoint by saving a checkpoint image of execution of the first version build at the checkpoint; and
- restarting execution, using the saved checkpoint image of execution of the first version build at the checkpoint, at least partly using a second version build of the software program or a modified version of the software program, the second version build comprising a second distinctly compiled executable that is different from the first distinctly compiled executable.

13. The non-transitory computer-readable media of claim 12, wherein the first version build comprises a more optimized version than the second version build the software program.

14. The non-transitory computer-readable media of claim 13, wherein the first version build comprises an optimized build of the software program generated by an optimizing compiler; and
- wherein the second version build comprises an unoptimized build, the unoptimized build compiled from the software program or the modified version of the software program using a compiler different from the optimizing compiler.

15. The non-transitory computer-readable media of claim 14, further comprising, after restarting execution at least partly using the unoptimized build, resuming execution of the software program using the optimized build.

16. The non-transitory computer-readable media of claim 14, further comprising:
- installing, after performing the checkpoint, the unoptimized build; and
- installing a jump from a text section of the software program to the unoptimized build.

17. The non-transitory computer-readable media of claim 16, further comprising performing debugging on the unoptimized build at least partly while restarting execution.

18. The non-transitory computer-readable media of claim 17, wherein restarting execution exclusively uses the unoptimized build without using the optimized build at all.

19. The non-transitory computer-readable media of claim 16, wherein the unoptimized build is compiled from the modified version of the software program comprising a software patch; and
- further comprising testing the software patch build at least partly while restarting execution.

20. The non-transitory computer-readable media of claim 19, wherein, during the restart of execution, only the software patch is executed in the unoptimized build and a remainder of the execution during the restart is the optimized build.

21. The non-transitory computer-readable media of claim 12, wherein the second version build is of the modified version of the software program.

22. The non-transitory computer-readable media of claim 21, wherein the checkpoint image comprises data structures and data set of the first version build at checkpointing; and
- wherein the modified version of the software program comprises a software patch configured to use the data structures and the data set upon restart.

23. A system, comprising: one or more processors, the one or more processors programmed to perform a method, the method comprising:
- executing a first version build of a software program, the first version build comprising a first distinctly compiled executable of the software program;
- performing a checkpoint by saving a checkpoint image of execution of the first version build at the checkpoint; and
- restarting execution, using the saved checkpoint image of execution of the first version build at the checkpoint, at least partly using a second version build of the software program or a modified version of the software program, the second version build comprising a second distinctly compiled executable that is different from the first distinctly compiled executable.

24. The system of claim 23, wherein the first version build comprises a more optimized version than the second version build the software program.

25. The system of claim 24, wherein the first version build comprises an optimized build of the software program generated by an optimizing compiler; and
- wherein the second version build comprises an unoptimized build, the unoptimized build compiled from the software program or the modified version of the software program using a compiler different from the optimizing compiler.

26. The system of claim 25, further comprising, after restarting execution at least partly using the unoptimized build, resuming execution of the software program using the optimized build.

27. The system of claim 25, further comprising:
- installing, after performing the checkpoint, the unoptimized build; and
- installing a jump from a text section of the software program to the unoptimized build.

28. The system of claim 27, further comprising performing debugging on the unoptimized build at least partly while restarting execution.

29. The system of claim 28, wherein restarting execution exclusively uses the unoptimized build without using the optimized build at all.

30. The system of claim 27, wherein the unoptimized build is compiled from the modified version of the software program comprising a software patch; and
- further comprising testing the software patch build at least partly while restarting execution.

31. The system of claim 30, wherein, during the restart of execution, only the software patch is executed in the unoptimized build and a remainder of the execution during the restart is the optimized build.

32. The system of claim 23, wherein the second version build is of the modified version of the software program.

33. The system of claim 32, wherein the checkpoint image comprises data structures and data set of the first version build at checkpointing; and
- wherein the modified version of the software program comprises a software patch configured to use the data structures and the data set upon restart.

* * * * *